United States Patent [19]

Tonomura et al.

[11] Patent Number: 5,274,610
[45] Date of Patent: Dec. 28, 1993

[54] ELECTRONIC READING DEVICE

[75] Inventors: Keisuke Tonomura, Akishima; Isao Mimura, Sakura, both of Japan

[73] Assignee: Casio Computer Co., Ltd., Tokyo, Japan

[21] Appl. No.: 856,503

[22] Filed: Mar. 24, 1992

[30] Foreign Application Priority Data

Mar. 29, 1991 [JP] Japan .................................. 3-67270
Apr. 12, 1991 [JP] Japan .................................. 3-79910

[51] Int. Cl.$^5$ ........................ G04B 47/00; G04F 7/00
[52] U.S. Cl. ........................................ 368/10; 368/107
[58] Field of Search ........................... 368/10, 89–113

[56] References Cited

U.S. PATENT DOCUMENTS

4,511,259 4/1985 Horiuchi ............................... 368/10
5,057,915 10/1991 Von Kohorn ......................... 358/84
5,115,390 5/1992 Fukuda et al. ...................... 364/146

Primary Examiner—Bernard Roskoski
Attorney, Agent, or Firm—Frishauf, Holtz, Goodman & Woodward

[57] ABSTRACT

In an electronic reading device, the bar code of the limit time set for a question to be solved is read with a bar code reader. This limit time data is set on a sub tract timer, which decrements as time passes. The bar code reader is also designed to read the answer bar code for the question. During the limit time, answer bar codes can be read with the bar code reader. Beyond the limit time, however, those codes cannot be read. This encourages the learner to solve the questions within the limit time, enhancing the learning effects.

7 Claims, 13 Drawing Sheets

| M | N | MA1 | MB1 | MC1 |
|---|---|---|---|---|
| FA | FS | MA2 | MB2 | MC2 |
| X | I | MA3 | MB3 | MC3 |
| U | R | MA99 | MB99 | MC99 |
| D | E | MA100 | MB100 | MC100 |
| F | | | | |

ELECTRONIC READING DEVICE

BACKGROUND OF THE INVENTION

1. Field of the Invention

This invention relates to an electronic reading device that makes it easy to answer examination questions within a specified limit time.

2. Description of the Related Art

There are various examinations including entrance examinations, qualifying examinations, and promotion tests, held in various aspects of daily life. One of the best ways to pass such examinations is attending appropriate classes and taking trial examinations to evaluate the learning results. Many exercise books are available for use in such educational facilities as well as for people who study for themselves.

In doing exercises with such workbooks, a solver first writes answers in the answer column, and then checks his or her answers, one by one, against the correct answers provided separately. The solver in turn calculates a score by adding the marks for the questions answered correctly.

Computing the marks, however, involves marking the answers with a circle to show that it was correct and striking the keys on a calculator, which is time-consuming and troublesome, sometimes discouraging a desire to learn more.

When questions must be answered within a limit time, the solver has to set the limit time on a timer or a clock and start it when beginning to solve the problems. After the limit time has elapsed and the alarm goes off, he or she stops answering the questions. Such a time setting action is bothersome.

Even if there is no limit time, the solver may want to know how long it took to solve the problems. In such a case, he or she should start a stopwatch immediately before starting to solve the problems and stop the stopwatch as soon as having finished answering the questions. In this situation, the solver sometimes forget to stop the watch accidentally. Besides, to time the test with a stopwatch is a nuisance to the solver.

SUMMARY OF THE INVENTION

Accordingly, the object of the present invention is to provide an electronic reading device capable of informing the solver that the limit time for a question has expired if it has happened or that how much time has been spent solving the problems.

The foregoing object is accomplished by providing a device designed to optically read the correct answer code from a plurality of answer codes, comprising: time measuring means for measuring time data; measurement starting means for causing the time measuring means to start measuring time data; optical reading means for optically reading answer codes; and display means for displaying the time data measured by the time measuring means at the time when a read is made with the optical reading means.

With the present invention of this configuration, it is possible to solve each problem according to the limit time for answering it, thereby improving the learning effects efficiently.

Applying this invention to actual examinations prevents examines from entering their answers after the limit time has expired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
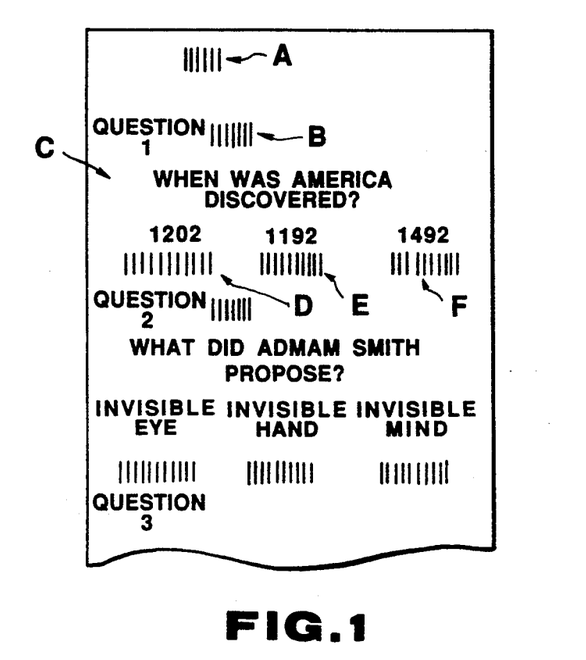
FIG. 1 is a pictorial view of an examination paper to be read with an electronic reading device according to the present invention.

FIG. 1 is a pictorial view of an examination paper for use with the present invention. An examination paper bar code $\underline{A}$ is printed at the top of the paper, below which a question number and a question bar code $\underline{B}$ indicating the question number are printed for each question. Following these, a question $\underline{C}$ is printed with choices $\underline{D}$, $\underline{E}$, and $\underline{F}$, one of which is a correct answer. Each choice has an answer bar code.

Figure 2:
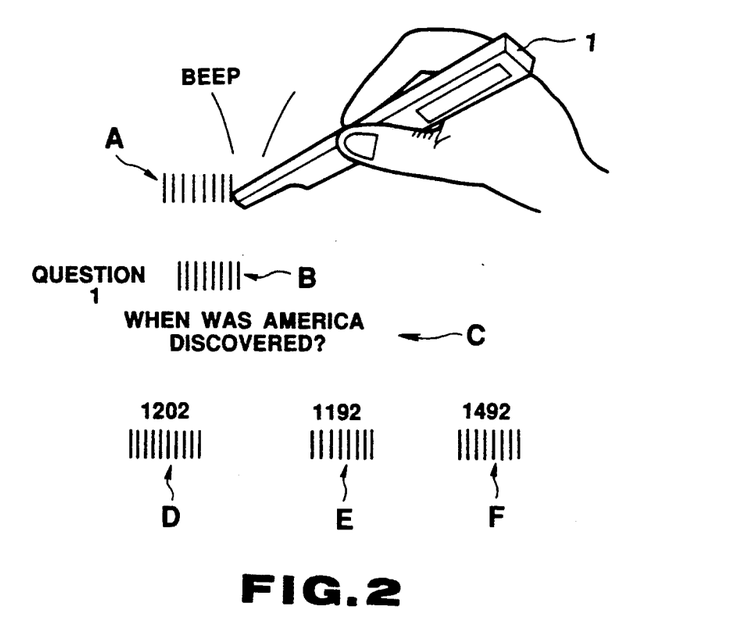
FIG. 2 is a schematic representation of how to read the examination paper bar code with an electronic reading device of the present invention.
Figure 3:
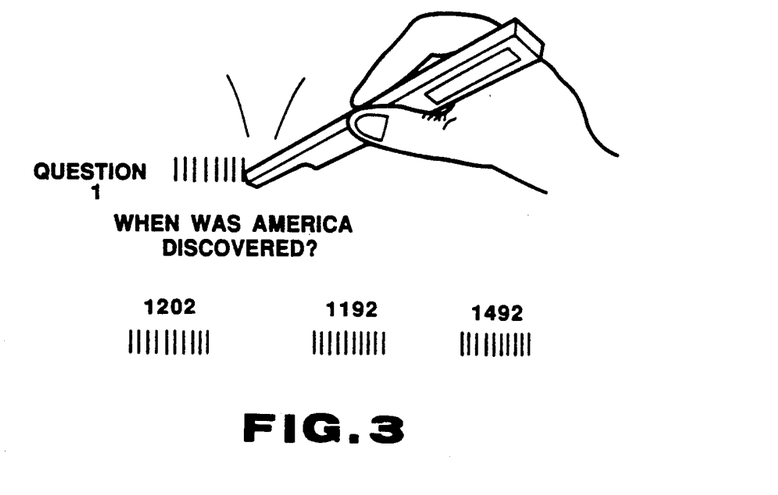
FIG. 3 is a schematic illustration of how to read question bar codes with the electronic reading device of the present invention.
Figure 4:
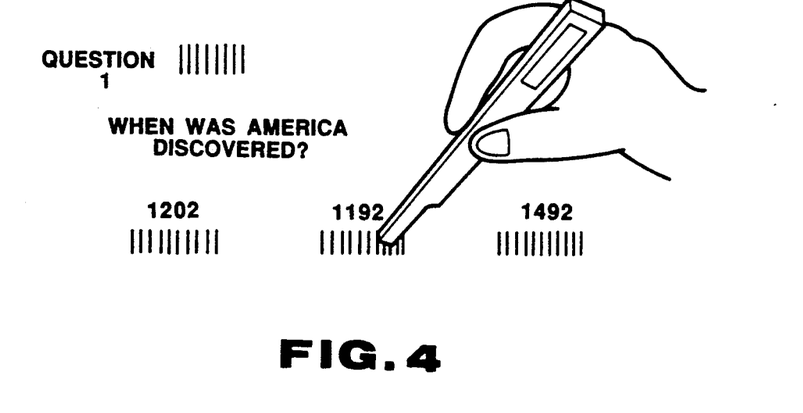
FIG. 4 is a schematic illustration of how to read answer bar codes with the electronic reading device of the present invention.

FIGS. 2 to 4 show how to use an electronic reading device of the present invention 1 (hereinafter, referred to as an electronic learning machine). A bar code reader is provided at the tip of the electronic learning machine 1. To read a bar code, the tip is moved across the code.

Before the problems on the examination paper are solved, the examination paper bar code is read as shown in FIG. 2. Just before each problem is solved, the question bar code is read with the bar code reader as shown in FIG. 3. To select an answer, the bar code reader is used to read an answer bar code as shown in FIG. 4.

Figure 5A:
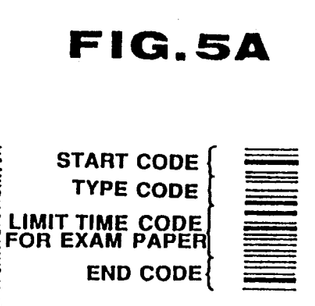
FIG. 5A shows the structure of an examination paper bar code.

FIGS. 5A to 5D illustrate the structure of each of the bar codes printed on the examination paper. FIG. 5A represents an examination paper bar code $\underline{A}$, which includes: a start code; a type code, which distinguishes an examination paper bar code from a question bar code and an answer bar code; a limit time code, which indicates the limit time within which the questions on this paper must be answered; and an end code, arranged in that order.

Figure 5B:
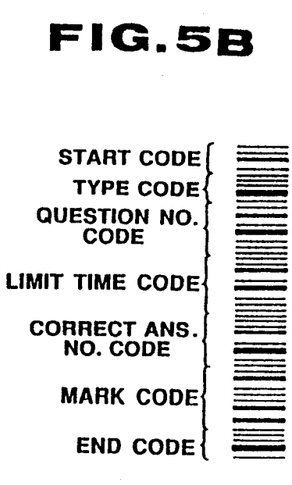
FIG. 5B shows the structure of a question bar code.

FIG. 5B shows a question bar code $\underline{B}$, which includes: a start code; a type code, which distinguishes a question bar code from an examination paper bar code and an answer bar code; a question number code indicating the number of the question; a limit time code indicating the limit time for this question; a correct answer number code; a mark code; and an end code, arranged in that order.

Figure 5C:
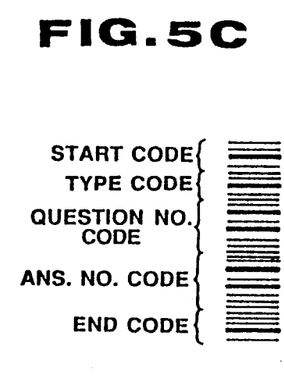
FIG. 5C shows the structure of an answer bar code.

FIG. 5C shows an answer bar code $\underline{D}$, $\underline{E}$, or $\underline{F}$, which includes: a start code; a type code, which distinguishes an answer bar code from an examination paper bar code and a question bar code; a question number code; an answer number code; and an end code, arranged in that order.

Figure 5D:
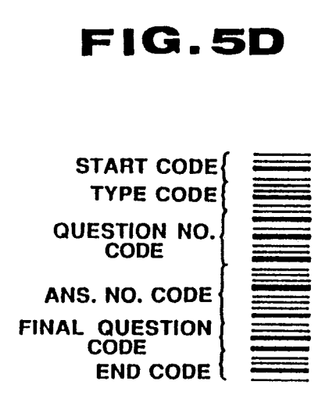
FIG. 5D shows the structure of the answer bar code for the final question.

FIG. 5D shows an answer bar code attached to the final question, which has the same structure as that of the above answer bar code except that a final question code is inserted between the answer number code and the end code to indicate that it is the final question.

Figure 6:
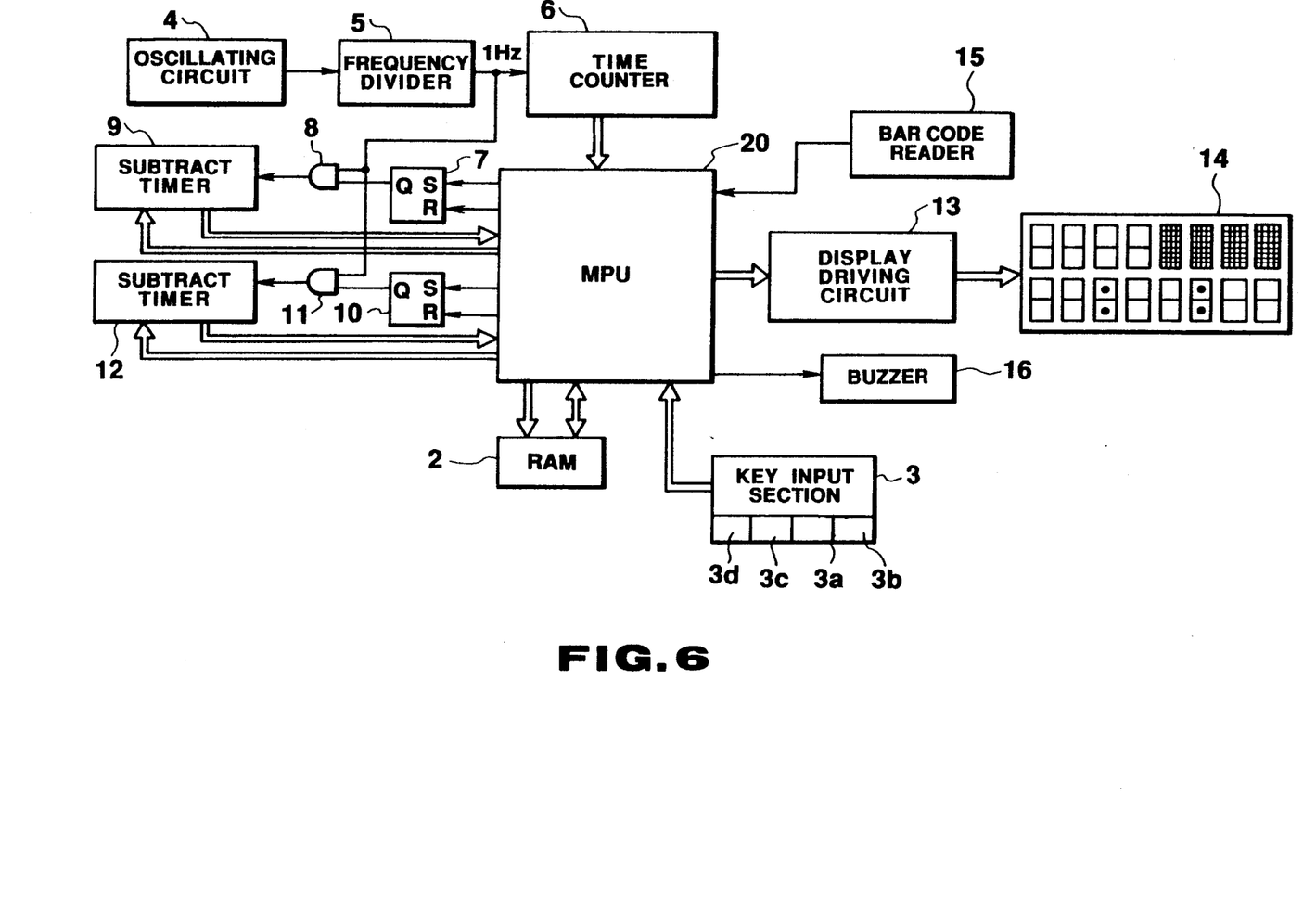
FIG. 6 is a block diagram of an electronic reading device of the present invention, centering around primary portions.

FIG. 6 is a block diagram of an electronic learning machine according to the present invention, centering around primary portions. In the figure, a microprocessor unit (MPU) 20 is provided with a CPU, a ROM, input/output ports, a clock generator, and others, all of which are not shown here. This MPU 20 is connected to a RAM 2 via a bus. The output of a key input section 3 is supplied to the MPU 20. The output of an oscillating circuit 4 is divided down into a 1-Hz signal at a frequency divider 5. This 1-Hz signal is supplied to a time counter 6. This time counter 6 produces a time signal T, a date signal D, and a day of the week signal Y, which are supplied to the MPU 20. The signal from one output port of the MPU 20 is supplied to an RS flip-flop 7, whose Q output is supplied to one input terminal of an AND gate 8. The other input terminal of the AND gate 8 receives the 1-Hz signal from the frequency divider 5. The output of the AND gate 8 is supplied to a subtract timer 9, which is connected to the MPU 20 via the bus so as to exchange data with the latter. The signal from another output port of the MPU 20 is supplied to an RS flip-flop 10, whose Q output is supplied to one input terminal of an AND gate 11. The other input terminal of the AND gate 11 receives the 1-Hz signal from the frequency divider 5. The output of the AND gate 11 is supplied to a subtract timer 12, which is connected to the MPU 20 via the bus so as to exchange data with the latter.

The signal from another output port of the MPU 20 is supplied to a display driving circuit 13, whose output drives the dot matrix of a display section 14. The teaching machine is provided with a bar code reader 15 for reading bar codes optically. The output of the bar code reader 15 is supplied to the input port of the MPU 20.

The signal from another output port of the MPU 20 is supplied to a buzzer 16, which undergoes on/off control.

Figure 7:
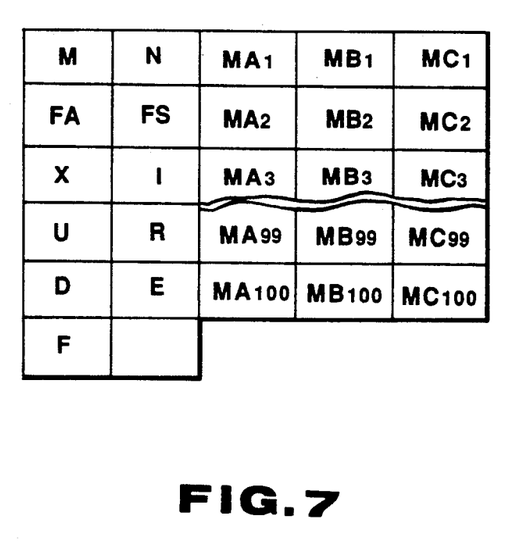
FIG. 7 shows the structure of the RAM of FIG. 6.

FIG. 7 illustrates the structure of the RAM. A mode register M stores an operation mode: "0" in the register specifies the time mode in which the current time appear on the display section 14; "1" the learning mode in which examination questions are allowed to be solved; and "2" the learning result display mode in which the results of learning is displayed. A register FA holds "1" during the time from when the examination paper bar code is read until all the questions on the paper are answered or until the limit time for the paper has elapsed. A register FS retains "1" during the time from when the question bar code for a question is read until the answer bar code is read or until the limit time for the question has elapsed. A register N stores the select number of the display data in the learning result display mode: "0" in the register allows the number of all questions and the total time spent answering the questions or the limit time set for the examination paper to be displayed; one of "1" to "N" in the register not only allows the question number and the time spent solving the question or the limit time for the question to be displayed, but also enables the display of "CORRECT" when the question is answered correctly, and of the choice number of the correct answer or OT (Over-Time) meaning that the question has not been answered within the limit time.

A register I stores the number of the question answered. A register $\underline{X}$ holds the score calculated from the questions answered correctly. A register U retains the time spent solving all the questions or the limit time for the question if it has not been answered within the limit time.

A register R stores data read by the bar code reader 15; a register $\underline{D}$ data on the examination paper bar code; a register E data on the question bar code; a register F data on the answer bar code. Registers $\underline{D}$, $\underline{E}$, and $\overline{F}$ accept data transferred from the register $\overline{R}$.

Memories MA1 to MA100 store the time spent answering each question; memories MB1 to MB100 right or wrong for each answer; and memories MC1 to MC100 the choice number of the correct answer to each question.

Figure 8:
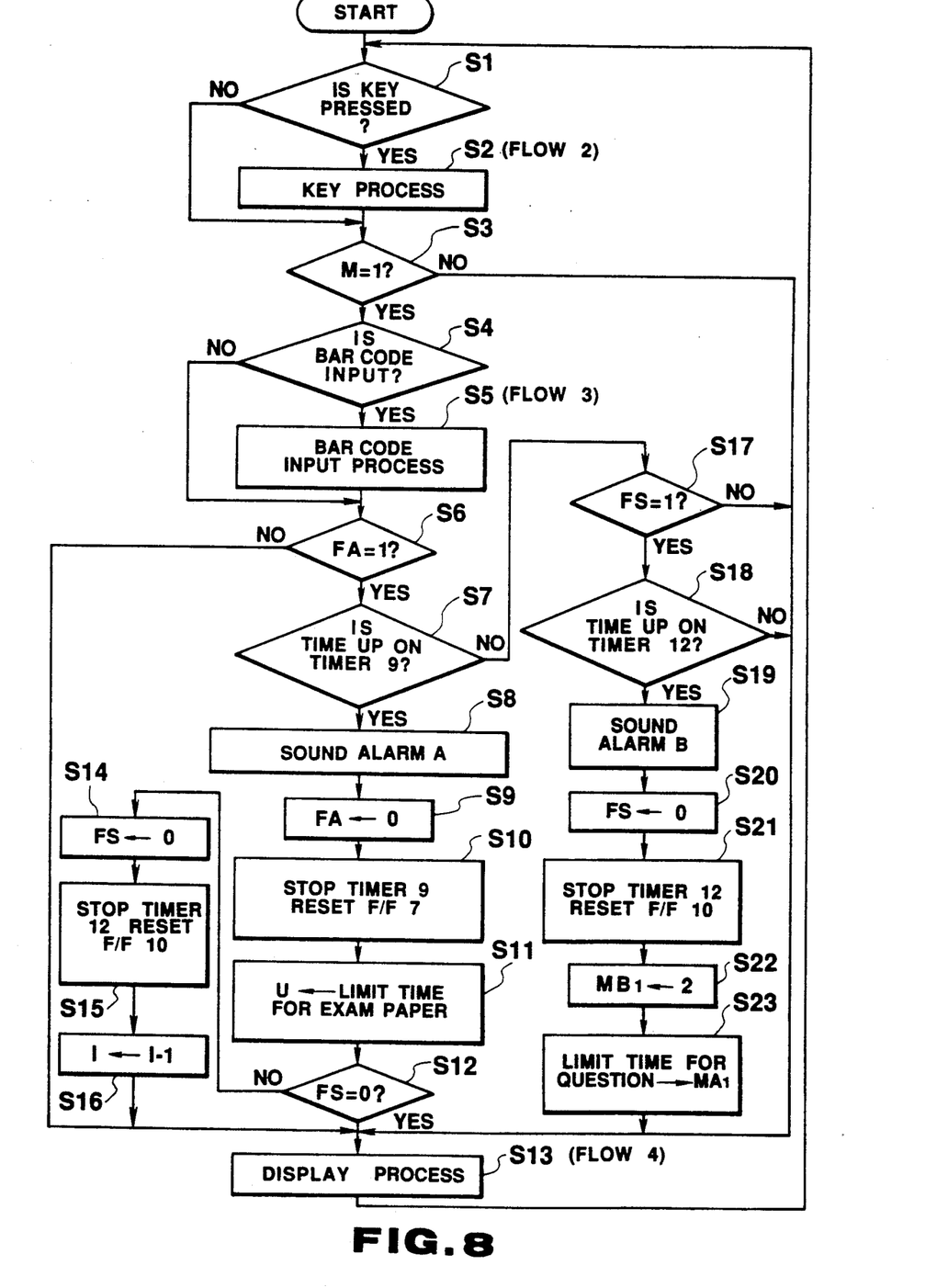
FIG. 8 is a general flowchart for the operation of an embodiment of the present invention.
Figure 9:
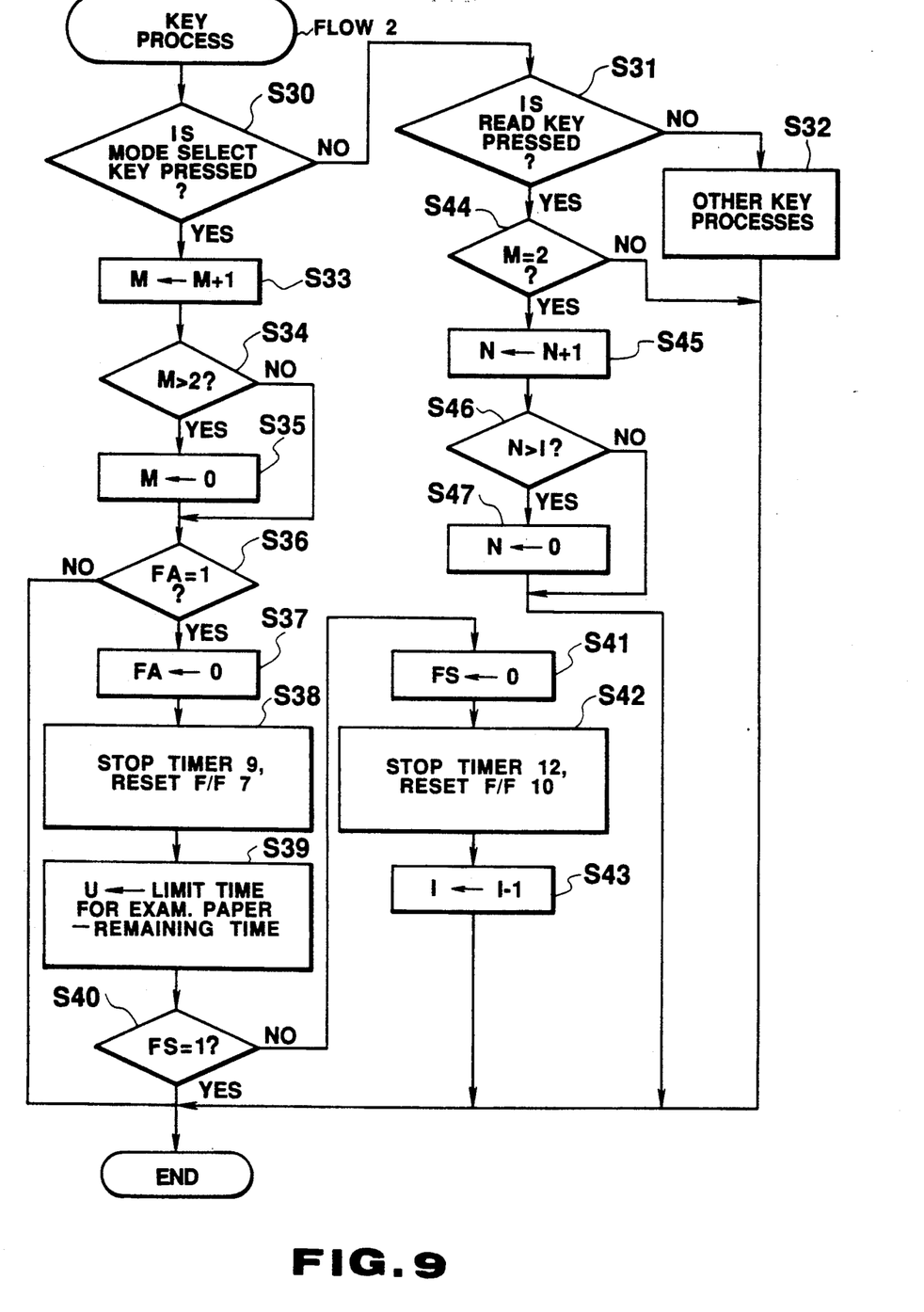
FIG. 9 is a detailed flowchart for the key process of FIG. 8.

FIG. 8 is a general flowchart for the operation of an embodiment of the present invention. After finishing execution of a particular initialize routine, the CPU in the MPU 20 starts execution of the program shown in the FIG. 8 general flowchart. At step S1, it is judged whether or not any key on the key input section 3 has been pressed. If no key has been pressed, control branches to step S3. If any key has been pressed, a key process, which will be explained in detail in FIG. 9, is carried out, and control goes to step S3. At step S3, a check is made for the learning mode (the register M contain "1"). If it is not in the learning mode, a display process is executed in the current at step S13, and control returns to step S1.

Figure 10:
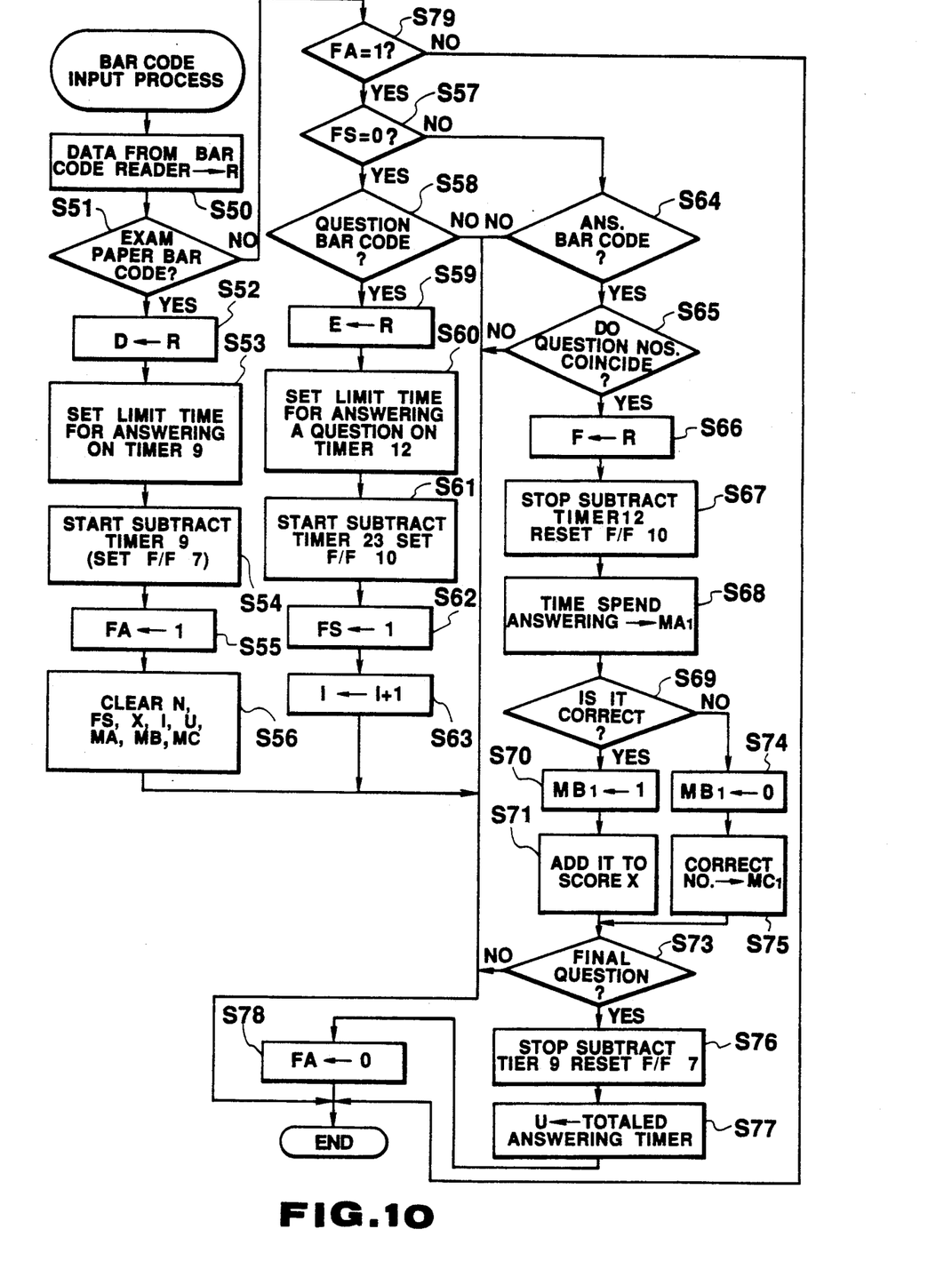
FIG. 10 is a detailed flowchart for the bar code input process of FIG. 8.
Figure 11:
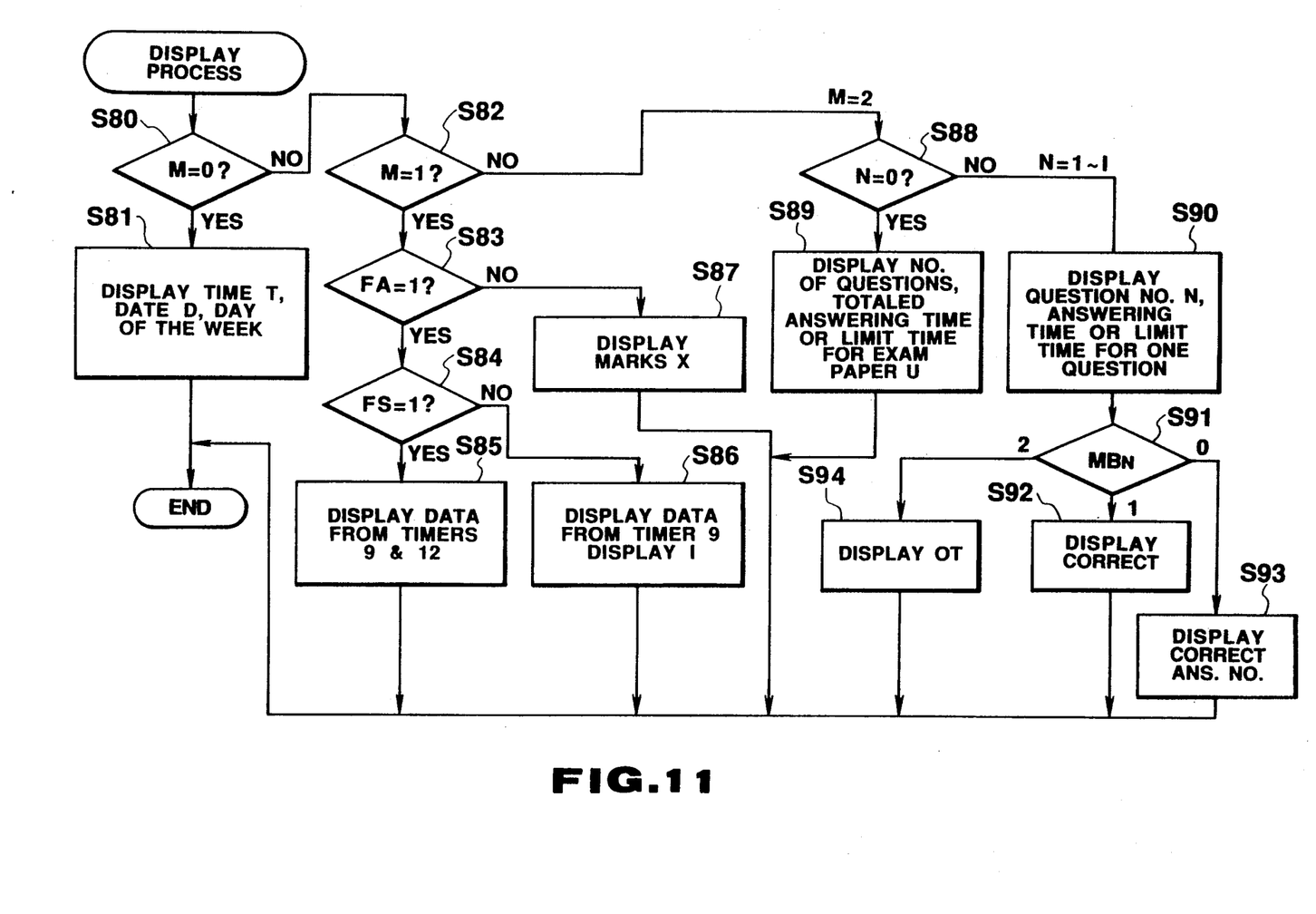
FIG. 11 is a detailed flowchart for the display process of FIG. 8.

If step S3 judges that it is in the learning mode, control is passed to step S4, where a check is made to see if there is any data input from the bar code reader. If there is no data input from the reader, control jumps to step S6. If there is data input from the reader, a bar code input process explained later in FIG. 10 is executed at step S5, and control proceeds to step S6. At step S6, it is judged whether or not the flag register FA contains "1," meaning that the solver is now learning. If it is not "1," a display process is carried out at step S13, and control returns to step S1. If it is "1" at step S6, control goes to step S7. At step 7, it is judged whether or not the subtract timer 9, which has been set and started in a switch process explained later, has gone down to zero. When the subtract timer 9 has decreased to zero, this means that the limit time for answering the questions on the examination paper has expired. If it is true, at step S8, the buzzer 16 is controlled to sound the alarm (A). Then, at step S9, "0" is set in the register FA for the non-learning state. At step S10, the RS flip-flop 7 is reset. Next, control proceeds to step S11, where data on the limit time for answering is set in the register $\underline{U}$. At step 12, a check is made to see if the flag indicating that the solver is working at the questions is down (if the register FS contains "0"). If the register FS holds "0," a display process, which is explained in detail in FIG. 11, is performed at step S13, and control is passed to step S1.

At step S12, when it is found that the register does not contain "0," control goes to step S14, where "0" is set in the register FS. Then, at step S15, the RS flip-flop 10 is reset to stop the subtract timer 12. At step S16, the register $\underline{I}$ counting the number of questions already answered is decremented by one. Next, control proceeds to step S13, where a display process is performed. Then, control returns to step S1.

On the other hand, as a result of the step S7 judgment, when it is found that the subtract timer 9 has not gone down to zero, control goes to step S17, where it is judged whether or not the solver is working at the questions (whether or not the register FS contains "1"). If the register FS does not retain "1," a display process is carried out at step S13, and then control returns to step S1. If the solver is working on the questions, control goes to step S18, where it is judged whether or not the limit time allocated to the question has elapsed, or the subtract timer 12 has decreased to zero. If the limit time has not expired yet, a display process is carried out at step S13, and control returns to step S1. If the limit time has expired already, control goes to step S19, where the buzzer 16 is controlled to sound the alarm (B). Then, at step S20, "0" is set in the register FS for the non-answering state. At step S21, the RS flip-flop 10 is reset. Next, control goes to step S22, where an overtime code "2" is written in the memory $MB_I$ (I is the value of register $\underline{I}$). Then, at step S23, data on the limit time for answering the question is written into the memory $MA_Z$, and control goes to step S13, where a display process is performed, and control returns to step S1.

FIG. 9 is a flowchart showing in detail the key process at step S2 in FIG. 8. In the key process, each time the mode select key 3a is pressed, the time mode, the learning mode, and the learning result display mode are selected alternately in that order. At step S30, a check is made to see if the mode select key has been pressed. If not, at step 31, it is judged whether or not the read key 3b has been pressed. If not, control proceeds to step S32, where another key process is performed and the process is terminated.

If the mode select key 3a has been pressed at step S30, at step S33, the register $\underline{M}$ is incremented by one. Then, at step S34, it is judged whether or not the value in the register $\underline{M}$ is larger than the number of the maximum mode of this teaching machine, or greater than "2" in this embodiment. If not, control goes to step S36. If true, control proceeds to step S35, where the register $\underline{M}$ is cleared, or the register $\underline{M}$ is reset to zero, and then control goes to step S36. In this way, the value of the register $\underline{M}$ contains any one of "0" to "2" every time the mode select key is pressed.

At step S36, it is judged whether or not the solver is now learning (the register FA contains "1"). If not, the process of flow 2 is terminated. If true, at step S37, the flag register FA is brought into the nonlearning state ("0" is set in the register FA). Then, at step S38, the RS flip-flop 7 is reset to stop the subtract timer 9. At step S39, data on the elapsed time until now (the value obtained by subtracting the remaining time from the limit time set for the examination paper) is written into the register $\underline{U}$. Then, at step S40, a check is made to see if the solver is working at the question (if the register contains "1"). If the register holds "1," the process of flow 2 is terminated. If not, at step S41, "0" is set in the register FS. Then, at step S42, the RS flip-flop 10 is reset to stop the subtract timer 12. At step S43, the register $\underline{I}$, which counts the number of questions already answered, is decremented by one, and the process of flow 2 is terminated.

As a result of the step S31 judgment, if the read key 3b has been pressed, at step S44, a check is made for the learning result display mode (the register contains "2"). If it is not in the learning result display mode, the process is terminated. If the learning result display mode has been selected, at step S45, the register $\underline{N}$, which counts and stores the select number of the displayed data, is incremented by one. Then, at step S46, it is judged whether or not the value of the register $\underline{N}$ is greater than the number of questions already answered (the value of the register $\underline{I}$). If not, the process is terminated. If true, meaning that all data on the questions already answered have been displayed, at step S47, "0" is set in the register $\underline{N}$, and the process of flow 2 is terminated.

FIG. 10 is a flowchart illustrating in detail the bar code process of flow 3. In the figure, at step S50, the data from the bar code reader 15 is set in the register $\underline{R}$. At step 51, it is judged whether or not the data is from the examination paper bar code. If it is the data on the examination paper bar code, at step S52, the contents of the register $\underline{R}$ are transferred to the register $\underline{D}$. At step S53, data on the limit time set for answering the questions on the examination paper (the examination time), which is read from the examination paper bar code, is set on the subtract timer 9. Then, at step S54, the RS flip-flop 7 is set to start the subtract timer 9. Next, at step S55, the flag is raised to show that the solver is now learning ("1" is set in the register FA). Then, at step S56, the registers $\underline{N}$, FS, $\underline{X}$, I, and $\underline{U}$, and the memories $MA_N$, $MB_N$, and $MC_N$ are cleared, and the process of flow 3 is terminated.

As a result of the step S51 judgment, if it is not from the examination paper bar code, control goes to step S79, where it is judged whether or not the flag register holds "1," meaning that the solver is now learning. If not, the process of flow 3 is terminated. If true, control proceeds to step S57, where it is judged whether or not the solver is not working at the question at present (the register FS contains "0"). If the solver is not solving the question, control proceeds to step S58, where it is judged whether or not the read-out data is from the question bar code. If true, at step S59, the read-out data in the register $\underline{R}$ is transferred to the register $\underline{E}$. Then, at step S60, the limit time for answering one question read from the question bar code (the answering time for each question) is set on the subtract timer 12. Next, at step S61, the RS flip-flop 10 is set to start the subtract timer 12. Then, at step S62, the flag is raised to indicate that the question is being answered ("1" is set in the register FS). After this, at step S63, the register I, which counts the number of questions answered, is incremented by one.

As a result of the step S57 judgment, if the question is now being answered (the register FS does not contain "0"), control goes to step S64, where it is judged whether or not the data from the bar code reader 15 is from the answer bar code. If not, the process of flow 3 is terminated. If true, at step S65, a check is made to see if the question number data on the question bar code agrees with the question number data on the answer bar code. If they disagree with each other, the process of flow 3 is terminated. If they coincide with one another, at step S66, the read-out data in the register $R$ is transferred to the register $F$. Then, at step S67, the RS flip-flop 10 is reset to stop the subtract timer 12. At step S68, the time spent answering the questions is calculated, and the result is written into the memory $MA_I$. Next, at step S69, a check is made to see if the answer is correct. If correct, at step S70, "1" is written into the memory $MB_I$. At step S71, mark data is added to the data in the register $X$, and control goes to step S72.

At step S69, if the answer is wrong, at step S74, "0" is written into the memory $MB_I$. At step S75, the correct answer choice number read from the question bar code is written into the memory $MC_I$, and then control proceeds to step S73.

At step S73, a check is made to see if the items of data read from the answer bar codes include the end code in order to judge whether or not the current question is the final one. If it is not the final question, the process of flow 3 is terminated. If it is the final one, at step S76, the RS flip-flop 7 is reset to stop the subtract timer 9. Then, at step S77, the sum of the time spent answering each question in the memory $MA_N$ or the total time is computed, and the resulting value is written into the register $U$. Next, at step S78, the flag indicting that the solver is now learning is reset ("0" is set in the register FA).

FIG. 11 is a detailed flowchart of the display process of flow 4. In the figure, at step S80, a check is made to see if the register $M$ contains "0," or if it is in the time mode. If it is in the time mode, at step S81, the current time T, the date D, and the day of the week Y appear on the display section 14, and the process of flow 4 is terminated. If it is judged that it is not in the time mode at step S80, step S82 judges whether or not it is in the learning mode. If it is in the learning mode, at step S83, a check is made to see if the flag register FA contains "1," meaning that the solver is now learning. If true, at step S84, a check is made to see if the solver is working at the questions (the register FS holds "1"). If true, at step S85, the elapsed time until now (the time on the timer 9) and the time spent answering the latest question (the time on the timer 12) appear on the display section 14, and the process of flow 4 is finished. If the register FS does not contain "1" at step S84, at step S86, the remaining time of the examination (the time on the timer 9) and the numbers of the questions already answered are displayed on the display section 14, and the process of flow 4 is completed.

As a result of the step S83 judgment, if the solver is not learning at present, at step S87, the marks for the questions answered correctly (the value of the register $X$) are displayed, and the process of flow 4 is terminated.

On the other hand, at step S82, the register $M$ contains "1," it is judged that the register $M$ contains "2" because the maximum value of the register $M$ is "2." That is, it is judged that it is in the learning result display mode, and step S88 judges whether or not the register $N$ contains "0." That is, it is judged whether or not it is at the beginning of the display mode or in the middle of it. If it contains "0," at step S89, the number of questions (the value of the register I) and the totaled time spent (the value of the register $U$) or the limit time set for the examination paper (the value of the register $U$) are displayed, and then the process of flow 4 is terminated.

At step S88, if the register $N$ does not retain "0," at step S90, the question number (the value of the register $N$), the time spent answering the question (the value of the memory $MA_N$) or the limit time for answering the question (the value of the memory $MA_N$) are displayed. At step S91, the answer is checked for right or wrong and for overtime (the value of the memory $MB_N$: 1 means right; 0 wrong; and 2 overtime). If it is the correct answer (the memory $MB_N$ contains "1"), at step S92, a representation meaning that the question is answered correctly is displayed, and the process of flow 4 is finished. If it is a wrong answer, at step S93, the correct answer number stored in the memory $MC_N$ is displayed, and then the process of flow 4 is terminated. If it is overtime (the memory $MB_N$ contains "2"), at step S94, a representation (OT) meaning that the time limit has been expired is displayed, and then the process of flow 4 is completed.

Figure 12A:
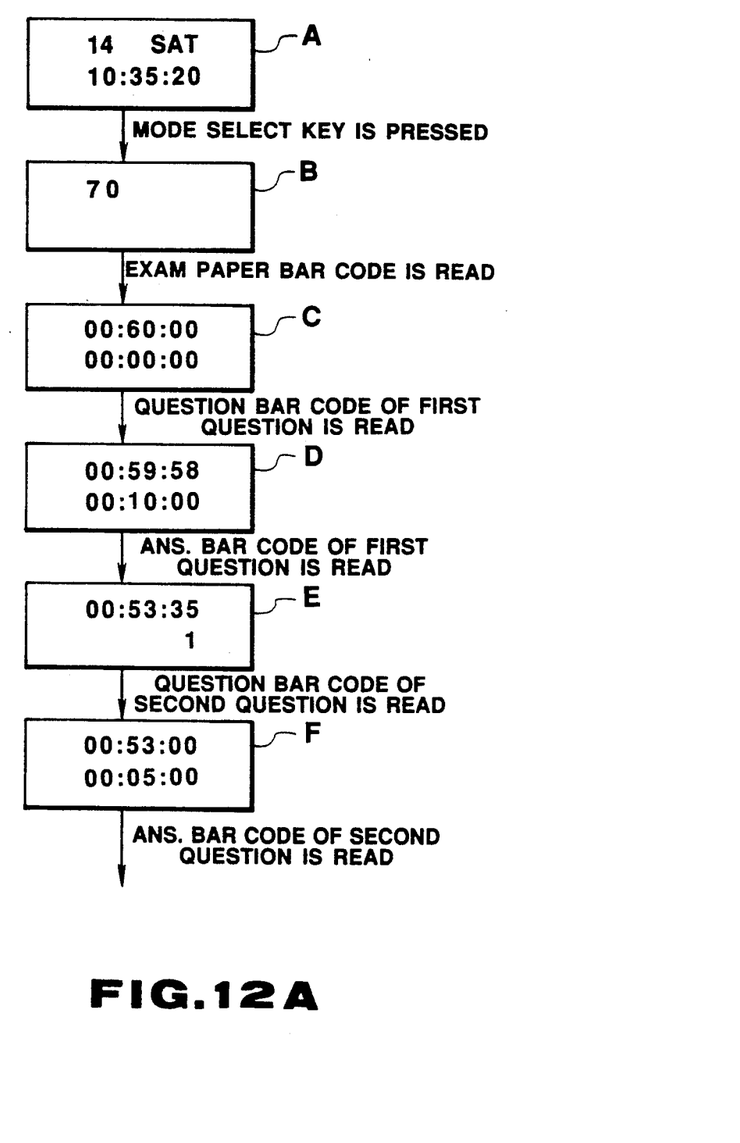
FIGS. 12A and 12B are explanatory views of what appears on the display section in the learning mode.
Figure 12B:
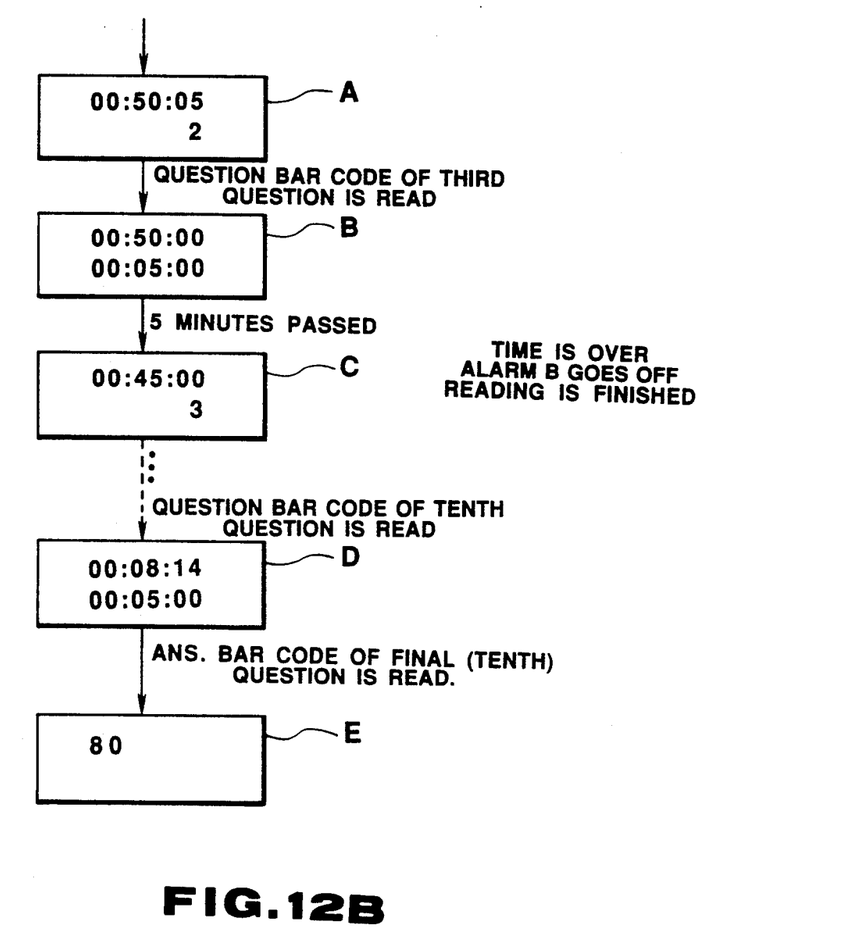

FIGS. 12A and 12B are explanatory views of what appears on the display section 14 in the learning mode. Execution of step S81 in the time mode allows the current date, the day of the week, and the time to appear on the display section 14: 14, SAT, 10: 35: 20, as shown in block $A$ at the top of FIG. 12A. Pressing the mode select key 3a enables execution of steps S82, S83, and S87, with the result that 70 marks for the previous examination appear on the display section 14 as shown in block $B$ in FIG. 12A. When the examination paper bar code is read, steps S52 to S56, and step S85 are executed, and the 60-minute limit time for the examination paper appears on the display section 14 as shown in block $C$ in FIG. 12A.

After the examination paper bar code in the first question has been read with the bar code reader, steps S59 to S63, and step S85 are executed, and the remaining time of the examination 00:59:58 (59 minutes 58 seconds) and the limit time 00:10:00 (10 minutes) for solving the first question appear on the display section 14 as shown in block $D$ in FIG. 12A. Then, when the answer bar code in the first question has been read with the bar code reader, steps S65 to S73, and step S86 are executed, and the remaining time of the examination 00:53:35 (53 minutes 35 seconds) and the question number 1 already answered (the value of the register I) appear on the display section 14 as shown in block $E$ in FIG. 12A. When the examination paper bar code in the second question has been read with the bar code reader, the remaining time of the examination 00:53:00 and the limit time 00:05:00 allowed for solving the second question appear on the display section 14 as shown in block $F$ in FIG. 12A. Then, when the answer bar code in the second question has been read with the bar code reader, the remaining time of the examination 00:50:05 and the question number 2 already answered appear on display section 14 as shown in block $A$ in FIG. 12B. After the examination paper bar code in the third question has been read with the bar code reader, the remaining time of the examination 00:50:00 and the limit time 00:05:00 for solving the third question appear on the display section 14 as shown in block B̲ in FIG. 12B. When the limit time for answering the third question has expired, steps S19 to S23 and step S86 are executed, and the buzzer 16 sounds the alarm (B) and the remaining time of the examination 00:45:00 and the question number 3 appear on the display section 14 as shown in block C̲ in FIG. 12B. From this point on, each time the question is answered, similar presentations appear on the display section 14. After the question code for the final question (the tenth question) has been read with the bar code reader, the remaining time of the examination 00:08:14 and the limit time 00:05:00 for solving the tenth question appear on the display section 14 as shown in block D̲ in FIG. 12B. When the answer bar code in the final question has been read with the bar code reader, steps S73 to S78, and step S87 are executed, and 80 marks appear on the display section 14 as shown in block E̲ in FIG. 12B.

Figure 13:
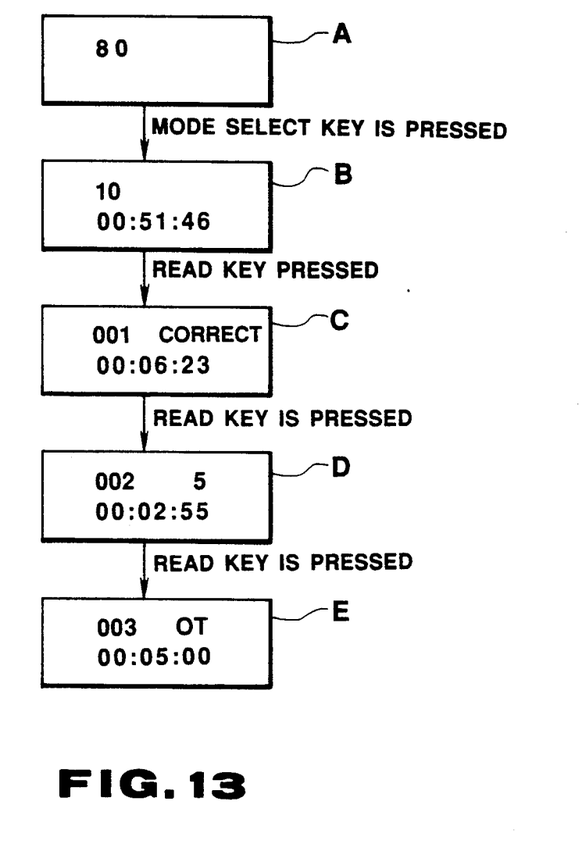
FIG. 13 is an explanatory view of what appears on the display section in the learning result display mode.

FIG. 13 is an explanatory view of what appears on the display section 14 in the learning result display mode. In block A̲ of FIG. 13, 80 marks for the previous examination appear on the display section 14. When the mode select key is pressed, steps S33 and S89 are executed, the number of questions 10 in the previous examination and the time spent answering all the questions 00: 51: 46 (51 minutes 46 seconds) appear on the display section 14. When the read key is pressed, the register N̲ is incremented by one at step S45, steps S90, S91, and S92 are executed, and the first question (001) CORRECT, and the time spent answering 00:06:23 are displayed as shown in block C̲ in FIG. 13. When the read key is pressed once again, in the case of the wrong answer, steps S90 and S91, and step S93 are executed, and the second question (002), the correct answer choice number 5 and the time spent answering 00:02:55 appear on the display section 14 as shown in block D̲ in FIG. 13. When the read key is pressed still once more, in the case where the time limit has been exceeded, steps S90 and S91, and step S94 are executed, and the third question (003), OT, and the time limit 00: 05: 00 appear on the display section 14 as shown in block E in FIG. 13. From this point on, each time the read key is pressed, similar data appears on the display section 14.

As described above, use of an electronic teaching machine of the present invention not only enables people to learn by answering examination questions with a bar code reader, but also allows them to feel as if they were taking an actual examination under the time limit for answering the questions. The time spent answering the questions is readily available. When one wants to know the results of the examination for each question, he or she can know whether or not each question has been answered correctly or within the limit time, by simple operation of the read key.

Figure 14:
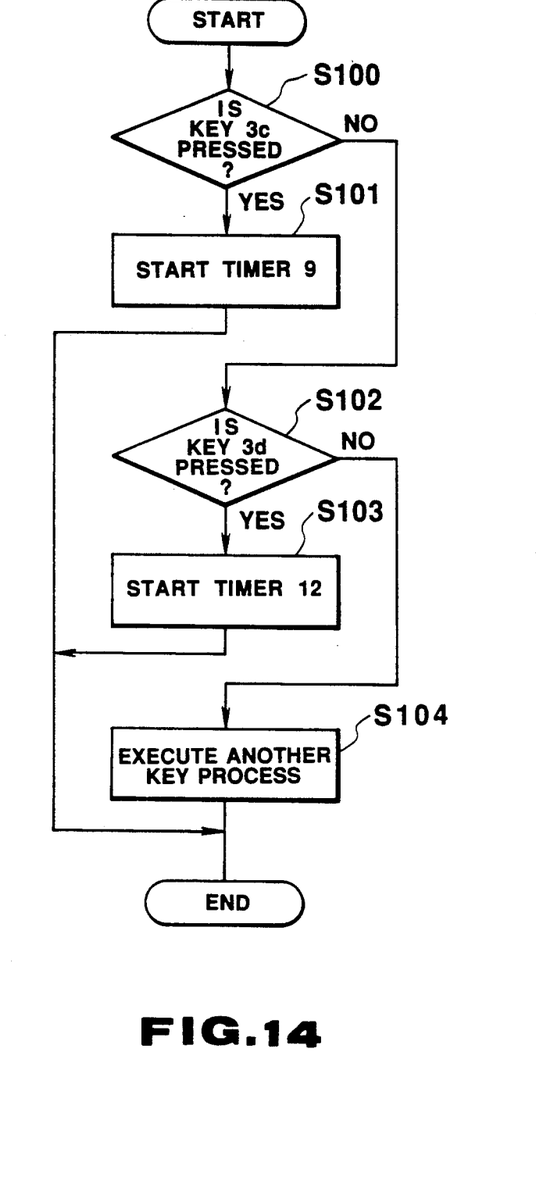
FIG. 14 is a flowchart for another embodiment of the present invention.

While in the above embodiment, the subtract timers 9 and 12 are started in steps S54 and S61 in FIG. 10, respectively, they may be started manually through external switches. For example, a first and second starting keys 3c and 3d may be used to construct step 32 of FIG. 9 as shown in FIG. 14. Specifically, as in FIG. 14, it is judged whether or not the first starting key 3c has been pressed at step S100. If true, at step S101, the subtract timer 9 is started. At step S102, it is judged that the second starting key 3d has been pressed, at step S103, the subtract timer 12 is started. If it is found that neither key 3c nor 3d has been pressed, at step S104, another key process is performed.

Although in the previous embodiment, a writing instrument-type electronic teaching machine is used, other types may be used. For example, the body may be of the desk-top-type with a hand-held bar code reading section. The bar code data from the reading section may be sent to the body by wire or radio. In this configuration, the body may be designed to connect with a plurality of bar code readers.

In the preceding embodiment, bar code data is read optically, but other types of code data may be used.

While the limit time set for solving the questions is read in the form of bar code, a desired time may be entered by the solver's key operation as the time limit. In the previous embodiment, the present invention is applied to exercises in a subject, but it may, of course, be applied to an actual examination.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical reading device, comprising:
    optical reading means for optically reading bar codes including a time bar code indicating a limit time, correct answer bar codes indicating correct answers, and selected answer bar codes;
    time measuring means for measuring time data; and
    control means for preventing said optical reading means from optically reading when the time data measured by said time measuring means has reached the limit time indicated by the time bar code read by said optical reading means.

2. A device according to claim 1, further comprising measurement control means for causing said time measuring means to start measuring time data when said optical reading means reads the time bar code or the correct answer bar code.

3. A device according to claim 1, further comprising measurement control means for causing said time measuring means to start measuring time data when said optical reading means reads the time bar code or the correct answer bar code, and for causing said time measuring means to stop measuring time data when said optical reading means has read the selected answer bar code.

4. A device according to claim 1, wherein said measurement control means includes externally operable switches for starting time data measurement.

5. A device according to claim 1, further comprising judging means for judging whether or not an answer code read by said optical reading means is correct.

6. A device according to claim 1, further comprising calculating means for calculating a score based on the answer codes read by said optical reading means.

7. A device according to claim 1, further comprising alarm means for sounding an alarm when a time measured by said time measuring means has reached a predetermined time.

\* \* \* \* \*